(12) United States Patent
Chen

(10) Patent No.: US 11,531,253 B1
(45) Date of Patent: Dec. 20, 2022

(54) CAMERA MOUNT

(71) Applicant: Yi-Wen Chen, Taoyuan (TW)

(72) Inventor: Yi-Wen Chen, Taoyuan (TW)

(73) Assignee: CORNER DESIGN CO., LTD., Taoyuan (TW)

( * ) Notice: Subject to any disclaimer, the term of this patent is extended or adjusted under 35 U.S.C. 154(b) by 0 days.

(21) Appl. No.: 17/506,464

(22) Filed: Oct. 20, 2021

(51) Int. Cl.
*G03B 17/56* (2021.01)
*F16M 11/10* (2006.01)
*F16M 13/02* (2006.01)

(52) U.S. Cl.
CPC .......... *G03B 17/561* (2013.01); *F16M 11/105* (2013.01); *F16M 13/022* (2013.01); *F16M 2200/022* (2013.01)

(58) Field of Classification Search
CPC ................ G03B 17/56–563; F16M 11/105
See application file for complete search history.

(56) References Cited

U.S. PATENT DOCUMENTS 3,836,927 A * 9/1974 Dine ...................... G03B 17/56
355/71

OTHER PUBLICATIONS

Really Right Stuff CRD-87 Package Camera Rotation Device B&HPhoto product page at https://www.bhphotovideo.com/c/product/1301058-REG/really_right_stuff_crd_87_pkg_crd_87_package_camera_rotation.html (Year: 2022).*
Youtube video "Really Right Stuff CRD-87" by shurato5814 at https://www.youtube.com/watch?v=VwFufgTgCnM (Year: 2016).*
Mamiya 645 Revolving Tripod Adapter N ianbfoto.com product listing at https://ianbfoto.com/product/mamiya-645-revolving-tripod-adapter-n/ (Year: 2022).*
Photo.net Forums post titled "Rotating bracket for a 645" at https://www.photo.net/forums/topic/61928-rotating-bracket-for-a-645/ (Year: 2005).*
Shuttermuse Glossary Entry for "Tripod Collar" at https://shuttermuse.com/glossary/tripod-collar/; Archive.org dated Oct. 2020 (Year: 2020).*
Astro Hutech Camera Rotator product page at http://www.sciencecenter.net/hutech/products/CameraRotator/; Archive.org dated Oct. 2, 2016 (Year: 2016).*
DPReview.com article by Jeremy Gray at https://www.dpreview.com/news/8487488165/kickstarter-atoll-tripod-collar and comments (Year: 2022).*

* cited by examiner

*Primary Examiner* — Leon W Rhodes, Jr.
(74) *Attorney, Agent, or Firm* — Che-Yang Chen; Law Office of Michael Chen

(57) ABSTRACT

A camera mount is disclosed in the present invention. The camera mount includes a gimbal fixing unit, a rotating unit, a camera base fixing unit, a camera fixing screw and a tightening screw. The gimbal fixing unit includes a fixing portion and a rotating portion, and the rotating unit includes a rotating round frame and a connecting structure. The design of the gimbal fixing unit and the rotating unit allows a camera to rotate the composition angle relative to the gimbal, which is convenient for changing the lens without compromising the line of sight of the lens, which solves the problems existing in the use of the gimbal.

13 Claims, 16 Drawing Sheets

CAMERA MOUNT

FIELD OF THE INVENTION

The present invention relates to a mount. More particularly, the present invention relates to a camera mount to fix a monocular camera on a gimbal, allowing the monocular camera to rotate its body relative to the lens without changing the direction of the lens.

BACKGROUND OF THE INVENTION

A camera is a tool that people use to capture instant images or record event videos. In most cases, the camera moves with the user, and at this moment it can be temporarily hung on the user's body by the camera strap. If the user is tired, he can remove the camera, put it in the camera bag for protection, and continue to carry it. In some cases, such as shooting water or night scenes that require a long exposure time, the camera will be placed on a stable gimbal tripod to perform shooting operations. For the use of gimbal tripod, there are some problems.

In the aforementioned problem, how to make the camera maintain the direction of the line of sight on the gimbal tripod but modifying the composition angle cannot be effectively solved. In the prior art, a tripod ring is installed on some lenses. The tripod ring can fix the camera on the gimbal, or help the camera lens rotate along the line of sight to adjust the composition angle. However, it is very troublesome to change the lens. The general replacement process is to separate the camera from the old lens, then install the new lens on the camera first, then remove the old lens from the gimbal, and finally install the camera on the gimbal by the tripod ring on the new lens. If the gimbal is moved due to improper operation, the sight direction of the new lens and the old lens will also change, and the photographer needs to re-adjust the gimbal tripod. Conversely, there are also some techniques that use a fixing frame to fix the camera on the gimbal, and it is very convenient to change the lens. However, it is difficult for the camera to change the composition angle.

Therefore, if it is desired to fix the camera on the gimbal, conveniently adjust the composition angle of the camera, and change the lens without compromising the line of sight of the lens, an innovative camera mount is required.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to solve the aforementioned problems, a camera mount is disclosed in the present invention. It comprises: a gimbal fixing unit, comprising: a fixing portion, being a flat structure having a pair of guide rails, detachably connected to a camera gimbal; and a rotating portion, comprising: an open ring, wherein curvature of any point on an inner surface of the open ring is changeable by force, an extension section is formed on a moving end of the open ring, and a first circular perforation is formed through the extension section; a holding body, vertically formed above the fixing portion and connected to a lower part of a fixed end of the open ring, wherein a second circular perforation is formed through the fixing portion, the holding body and the lower part of the fixed end, and a first screw hole perpendicular to the second circular perforation is formed in one side of the holding body; and an elastic limit device, installed inside the second circular perforation, capable of being elastically protruded into the open ring and pressed back into the second circular perforation; a rotating unit, comprising: a rotating round frame, wherein a surrounding groove is formed around a periphery of the rotating round frame toward a center of circle of the rotating round frame, a plurality of third circular perforations are formed in the bottom of the surrounding groove, a plurality of camera fixing boards are formed on one side of the surrounding groove, and the open ring is sleeved on the surrounding groove so that the rotating round frame is rotatable inside the open ring; and a connecting structure, formed on an end of one of the camera fixing boards, having a plurality of first through holes; a camera base fixing unit, wherein a second through hole is formed in the center of the camera base fixing unit, one side of the camera base fixing unit has a plurality of second screw holes, and screws pass through the first through holes to lock in the second screw holes, respectively, so that the camera base fixing unit is fixed to the rotating unit; a camera fixing screw, connected to a screw hole at a bottom of a camera through the second through hole to detachably fix the camera base fixing unit to the camera; and a tightening screw, screwed to the first screw hole through the first circular perforation, wherein when the tightening screw is tightened, the moving end moves closer to the fixed end and the open ring clamps the surrounding groove to limit the relative position of the rotating round frame and the open ring.

The elastic limit device may further comprises: a limit rod, having a limit bump section, a stop section formed below the limit bump section, and a spring fixing section formed below the stop section, wherein an outer diameter of the stop section is larger than that of the limit bump section and that of the spring fixing section; a spring, having one end covering outside of the spring fixing section; and a positioning screw, touched closely to the other end of the spring by an end thereof. The second circular perforation narrows to the inside at the fixed end, allowing the limit bump section to pass but not allowing the stop section to pass; an internal thread is formed in the second circular perforation in the fixing portion for screwing the positioning screw; when the rotating unit rotates relative to the gimbal fixing unit, the limit bump section is forced by the bottom of the surrounding groove to move into the second circular perforation; when the rotating unit rotates relative to the gimbal fixing unit so that the limit bump section faces the third circular perforation, the limit bump section is bounced back by the spring and protrudes from the second circular perforation, stuck in the third circular perforation.

According to the present invention, a positioning ring is installed in the third circular perforation so that when the limit bump section is in the third circular perforation, the limit bump section is restricted thereby the rotating round frame does not rotate with the open ring. A top of the limit bump section forms a frustum, and an accommodating space corresponding to the frustum is formed inside the positioning ring. The third circular perforation has two segments with different inner diameters, and two outer diameters slightly smaller or equal to the inner diameters of the two segments are formed on the outside of the positioning ring, respectively, thus the positioning ring is able to be stuck in the third circular perforation without falling.

According to the present invention, a top of the camera base fixing unit may be a plane, an elastic anti-slippery board is attached to the plane to increase the friction between the camera base fixing unit and the camera, and a third through hole is formed in the elastic anti-slippery board where is corresponding to the second through hole.

Preferably, an articulated structure may be further formed between the moving end and the fixed end, and the moving end is able to rotate relative to the articulated structure so that the open ring is open to sleeve on the surrounding groove.

When the camera mount is installed on the camera, the camera fixing boards are touched closely to the camera body to stop the camera body from shaking to hit the rotating round frame. A camera lens is able to install on the camera body through the rotating round frame, or remove from the camera body.

According to the present invention, the third circular perforations are formed equidistantly at the bottom of the surrounding groove. Preferably, there are 4 third circular perforations, formed right below, leftmost, right above and rightmost of the rotating round frame, respectively.

A fourth circular perforation may be further formed in the fixing portion for fixing the camera gimbal with a screw.

The design of the gimbal fixing unit and the rotating unit allows the camera to rotate the composition angle relative to the gimbal, which is convenient for changing the lens without compromising the line of sight of the lens, which solves the problems existing in the use of the gimbal.

DETAILED DESCRIPTION OF THE PREFERRED EMBODIMENTS

The present invention will now be described more specifically with reference to the following embodiments.

Figure 1:
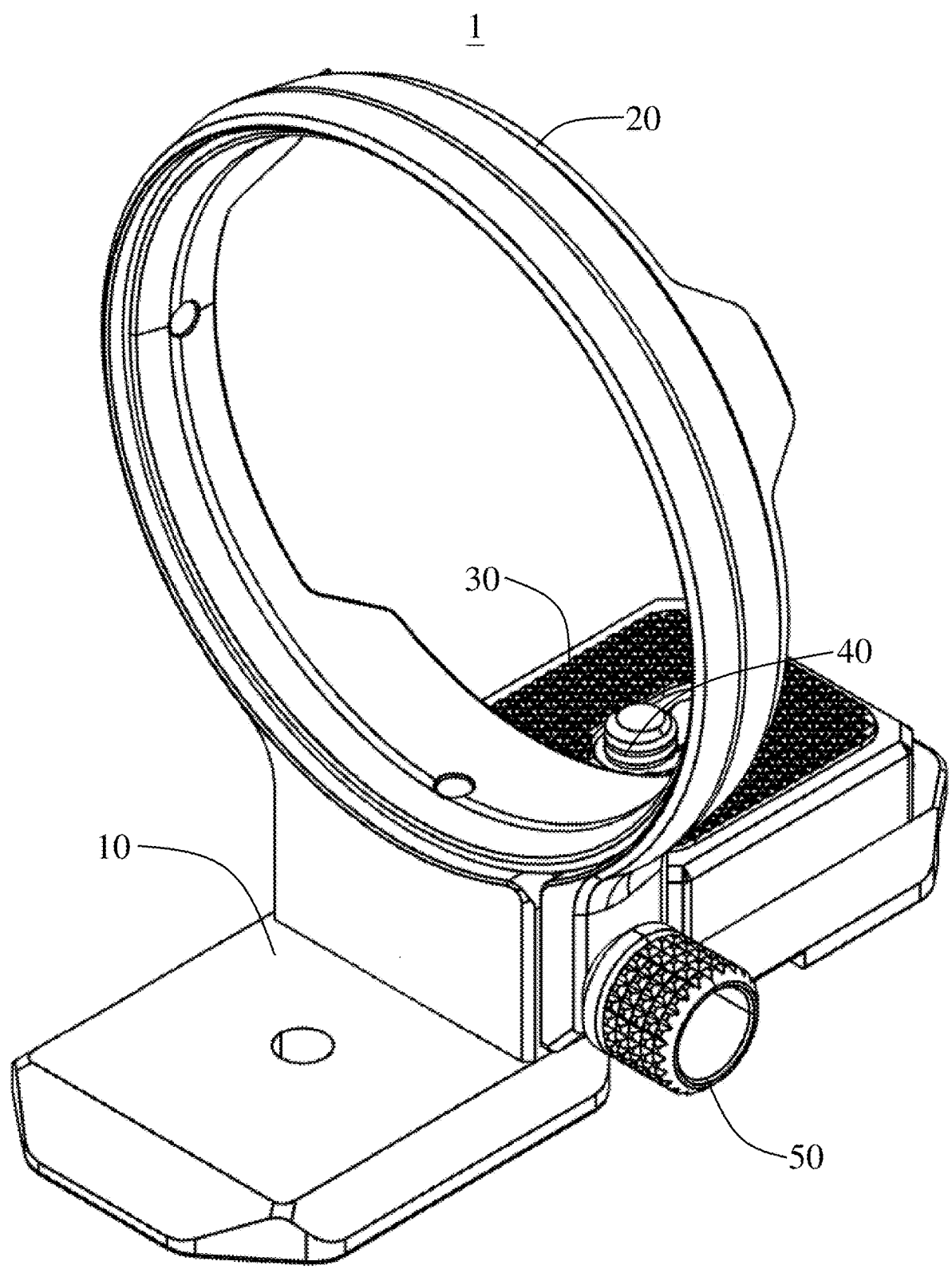
FIG. 1 is an appearance figure of a camera mount according to an embodiment of the present invention.

Please FIG. 1. It is an appearance figure of a camera mount 1 according to an embodiment of the present invention. The camera mount 1 proposed by the present invention is a tool used to combine a camera with a gimbal tripod, allowing the camera to adjust its composition angle (flip the angle of the top of the camera relative to the normal of the ground plane along the line of sight of the lens) while maintaining the direction of the line of sight of the lens. According to the present invention, the camera mount 1 includes a gimbal fixing unit 10, a rotating unit 20, a camera base fixing unit 30, a camera fixing screw 40 and a tightening screw 50. Types and functions of the aforementioned technical components, as well as the installation and use of camera mount 1, will be described in detail below.

Figure 2:
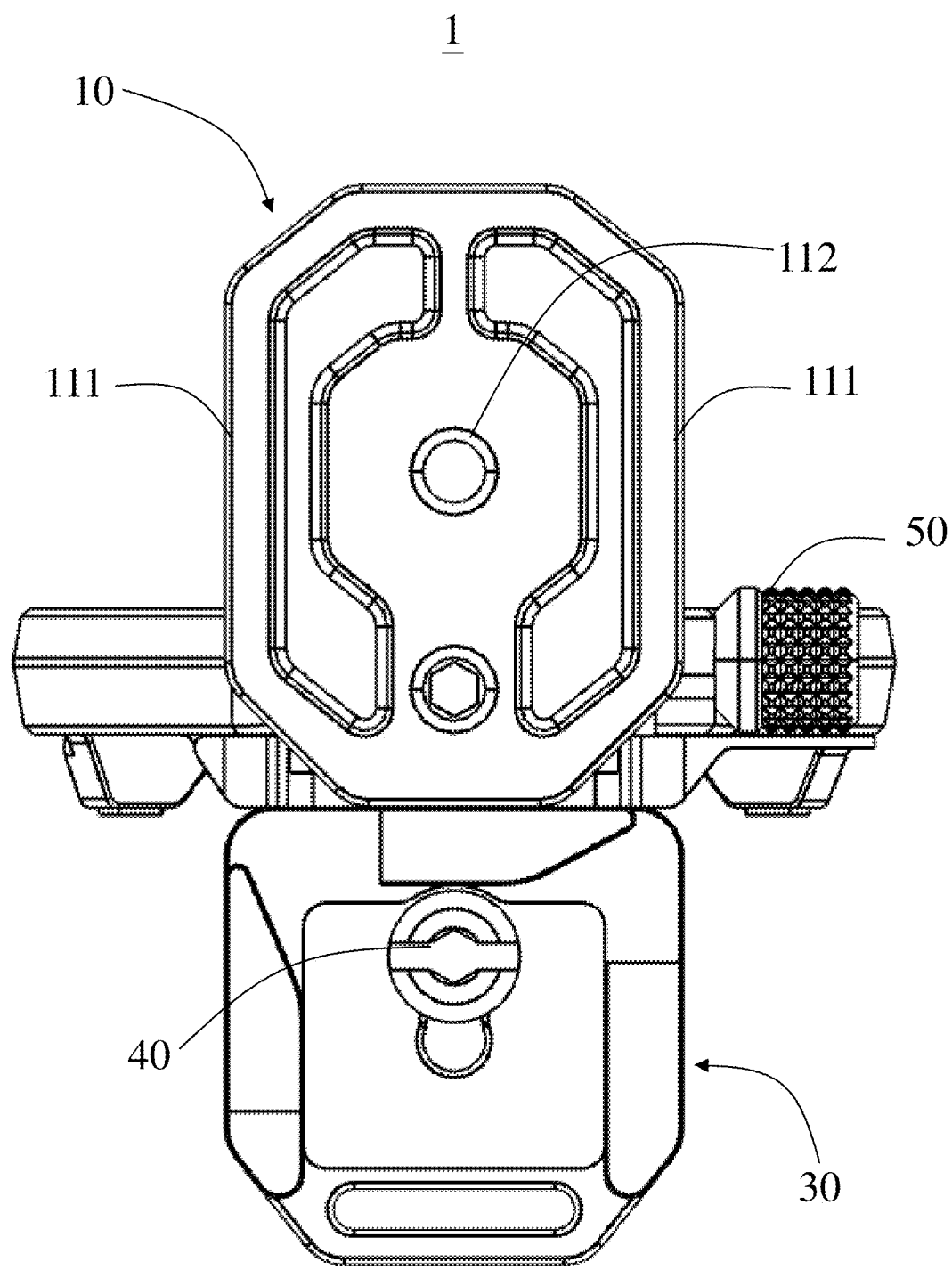
FIG. 2 is a bottom view of the camera mount.
Figure 3:
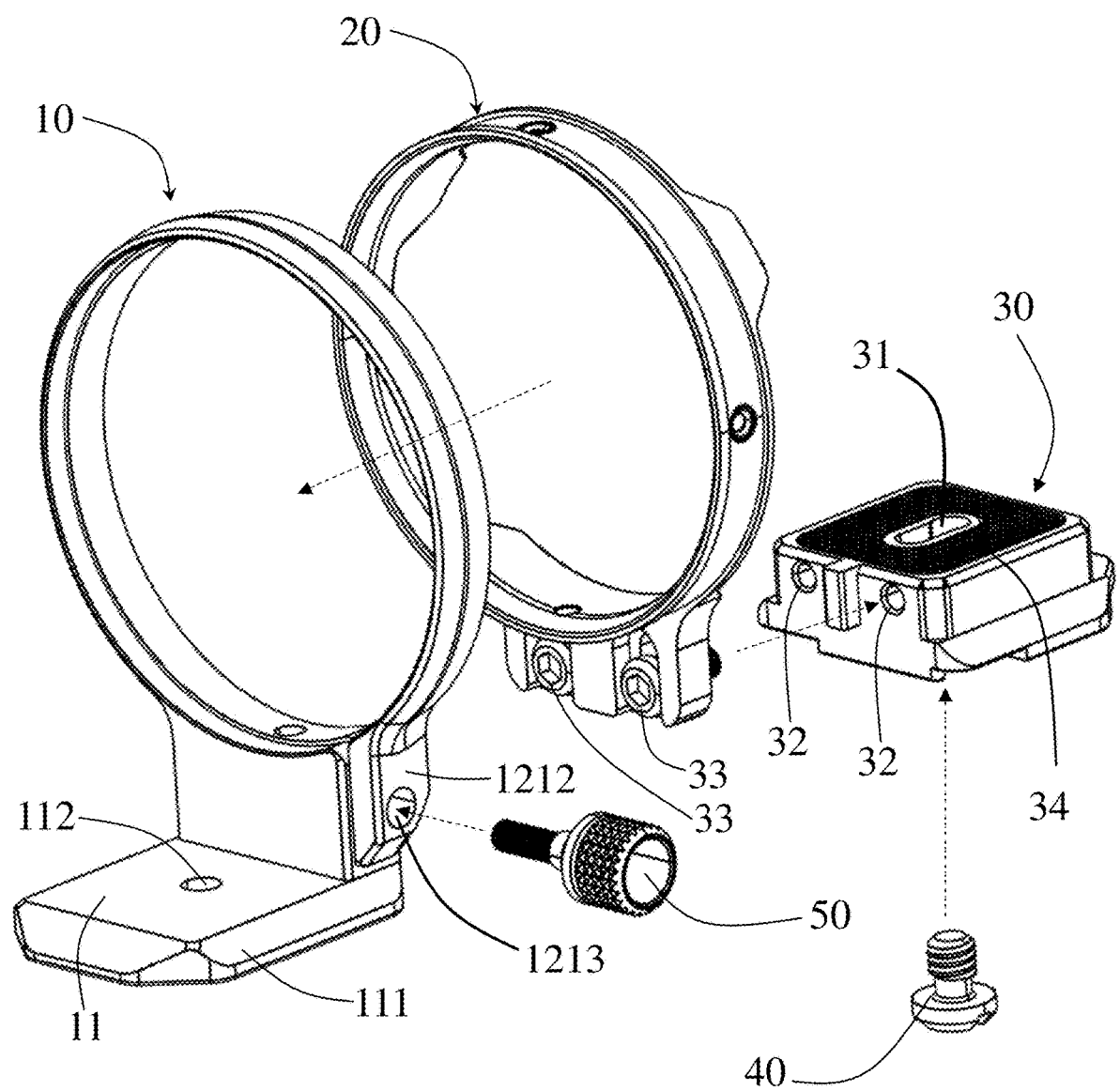
FIG. 3 is an explosion diagram of some key components of the camera mount.

The gimbal fixing unit 10 is a component used to combine the camera mount 1 and a gimbal. Please refer to FIG. 3. It is an explosion diagram of some key components of the camera mount 1. FIG. 3 includes an appearance figure of the gimbal fixing unit 10. Structurally, the gimbal fixing unit 10 includes a fixing portion 11 and a rotating portion 12. In practice, a portion of the fixing portion 11 and the rotating portion 12 can be made in one piece. The division into two parts is based on different shapes and functions to give a more detailed description of the gimbal fixing unit 10. Please refer to FIG. 2 at the same time. FIG. 2 is a bottom view of the camera mount 1. The bottom design of the fixing portion 11 can be seen. The fixing portion 11 is a flat structure having a pair of guide rails 111. It can be detachably connected to a guide groove of a camera gimbal. The guide rail 111 can comply with some commonly used gimbal design specifications in the industry, such as ARCA quick release board specifications. Generally speaking, the guide rail 111 is combined with the guide groove of the gimbal only, and the clamping force between the two may not be strong. It's better to add the screw's locking force. Gimbals almost have a design that comes with a screw hole. Hence, a fourth circular perforation 112 is also formed in the fixing portion 11 for fixing the camera gimbal with a screw. Preferably, the fourth circular perforation 112 has an internal thread that matches the screw's thread.

Figure 4:
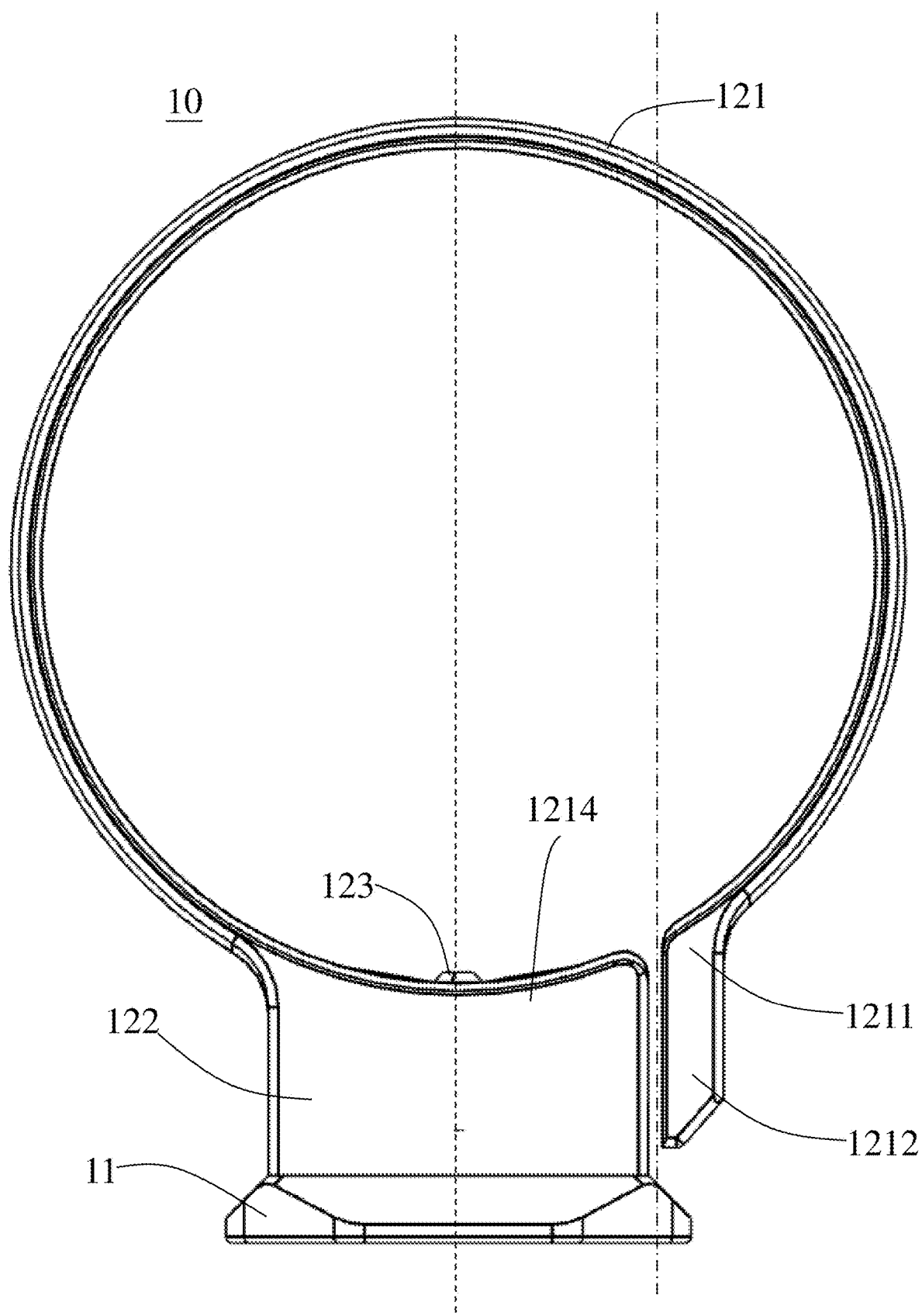
FIG. 4 is a front view of a gimbal fixing unit.
Figure 7:
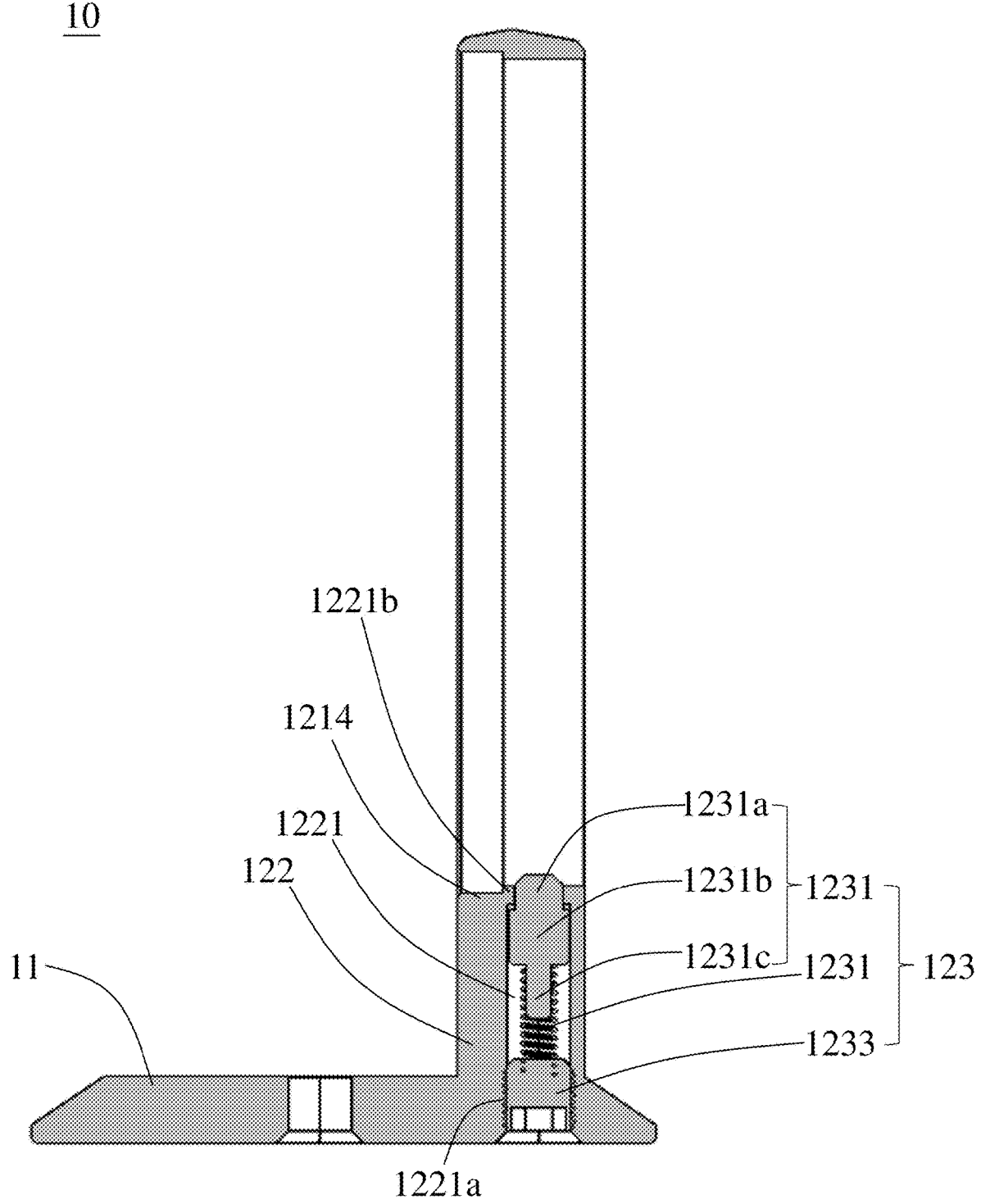
FIG. 7 is a section diagram the gimbal fixing unit along the dashed line of FIG. 4.
Figure 8:
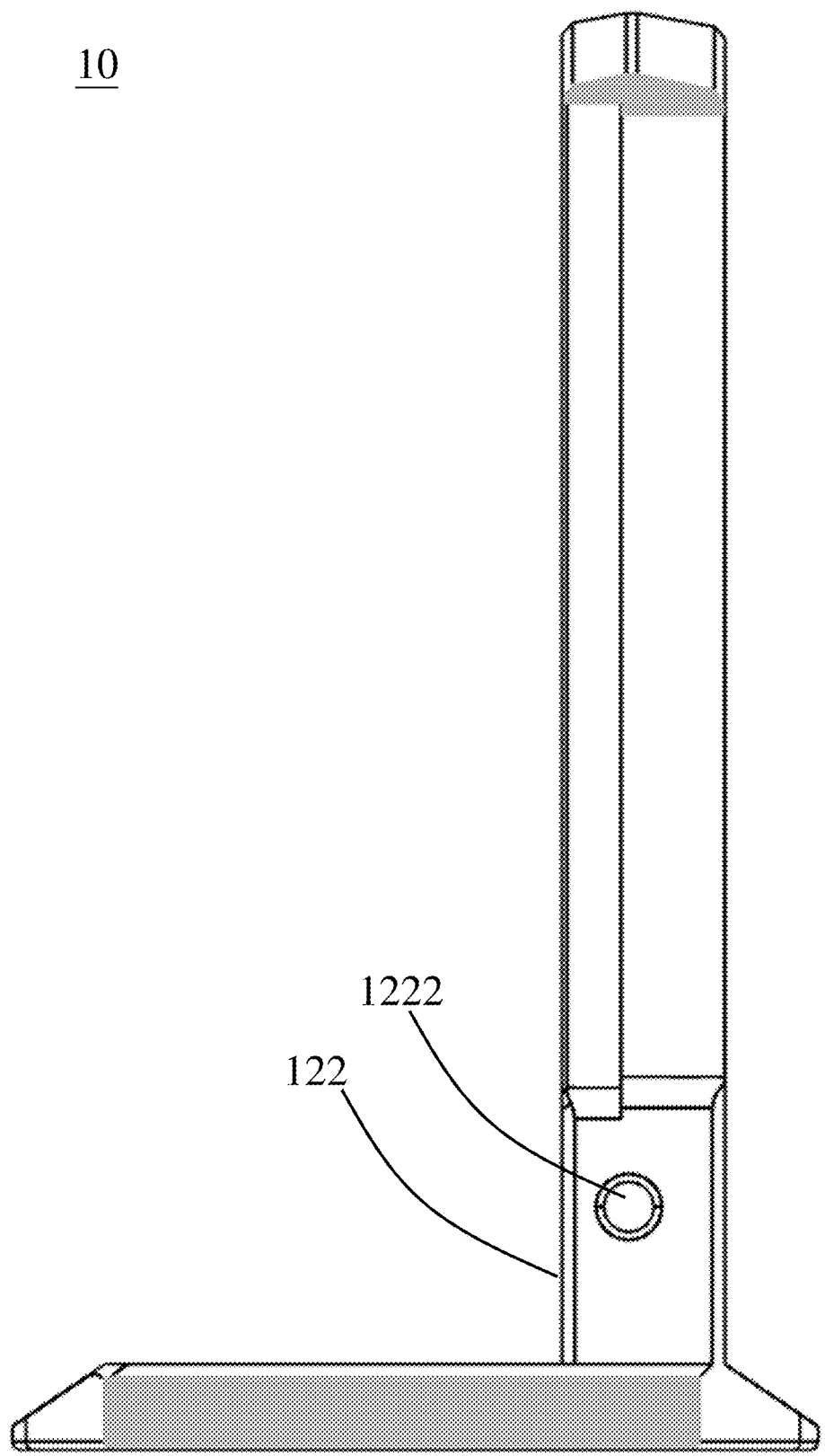
FIG. 8 is a section diagram the gimbal fixing unit along the dashed-dotted line of FIG. 4.

Please see FIG. 4. It is a front view of the gimbal fixing unit 10, illustrating the front of the rotating portion 12. The rotating portion 12 includes an open ring 121, a holding body 122 and an elastic limit device 123. The open ring 121 is a flexible structure. When squeezed or pulled, curvature of any point on an inner surface of the open ring 121 is changeable by force. An extension section 1212 is formed on a moving end 1211 of the open ring 121. A first circular perforation 1213 (unable to look directly in FIG. 4, shown in FIG. 3) is formed through the extension section 1212. The other end of the open ring 121 is a fixed end 1214. The fixed end 1214 is defined relative to the moving end 1211 because it is connected with and restricted by the holding body 122 and cannot move freely. Overall, the moving end 1211 and the fixed end 1214 are two ends of an opening of the open ring 121. It can be seen from FIG. 4 that when the moving end 1211 is drawn closer or farther away from the fixed end 1214, the curvature of any point on the inner surface of the open ring 121 changes due to force. A direct result is the size of the enclosed area in open ring 121. The holding body 122 is vertically formed above the fixing portion 11 and connected to a lower part of a fixed end 1214 of the open ring 121. For the internal structure design of holding body 122, see FIG. 7. It is a section diagram the gimbal fixing unit 10 along the dashed line of FIG. 4. For ease of explanation, if the diagram is a section diagram, the shaded part indicates the part that is sectioned. A second circular perforation 1221 is formed through the fixing portion 11, the holding body 122 and the lower part of the fixed end 1214. In addition, please see FIG. 8. It is a section diagram the gimbal fixing unit 10 along the dashed-dotted line of FIG. 4. A first screw hole 1222 perpendicular to the second circular perforation 1221 is formed in one side of the holding body 122.

The elastic limit device 123 is installed inside the second circular perforation 1221 and capable of being elastically protruded into the open ring 121 and pressed back into the second circular perforation 1221. In order to achieve the operation purpose of the elastic limit device 123, the elastic limit device 123 has the following detailed structure. Please see FIG. 7 again. The elastic limit device 123 includes a limit rod 1231, a spring 1232 and a positioning screw 1233. The limit rod 1231 has a limit bump section 1231a, a stop section 1231b formed below the limit bump section 1231a, and a spring fixing section 1231c formed below the stop section 1231b. Any cross section of the limit rod 1231 is round, the only difference lies in the outer diameter of each section. An outer diameter of the stop section 1231b is larger than that of the limit bump section 1231a and that of the spring fixing section 1231c. The outer diameter of the limit bump section 1231a is larger than that of the spring fixing section 1231c. One end of the spring 1232 covers outside of the spring fixing section 1231c, so as to stabilize the relative position of the spring fixing section 1231c in the second circular perforation 1221. When the spring 1232 is under pressure, the spring fixing section 1231c can go deep into the spring 1232; when the spring 1232 is released from pressure, the spring fixing section 1231c can rebound from the spring 1232, but will not depart from the spring 1232. An end of the positioning screw 1233 is touched closely to the other end of the spring 1232. The spring 1232 can be regarded as limited by the limit rod 1231 and the positioning screw 1233, and can only be stretched within a fixed space in the second circular perforation 1221. In order to install the positioning screw 1233, an internal thread 1221a is formed in the second circular perforation 1221 in the fixing portion 11 for screwing the positioning screw 1233. One thing needs to be noted that the second circular perforation 1221 narrows to the inside at the fixed end 1214 to from a narrowing section 1221b, allowing the limit bump section 1231a to pass but not allowing the stop section 1231b to pass.

In terms of materials, the fixing portion 11, the open ring 121, the holding body 122 and the limit rod 1231 can be made of aluminum alloy that is light and hard but has a certain degree of flexibility. The spring 1232 and the positioning screw 1233 can use suitable stocks of general steel or alloy steel. The positioning screw 1233 can also use carbon steel, stainless steel or copper as materials.

Figure 9:
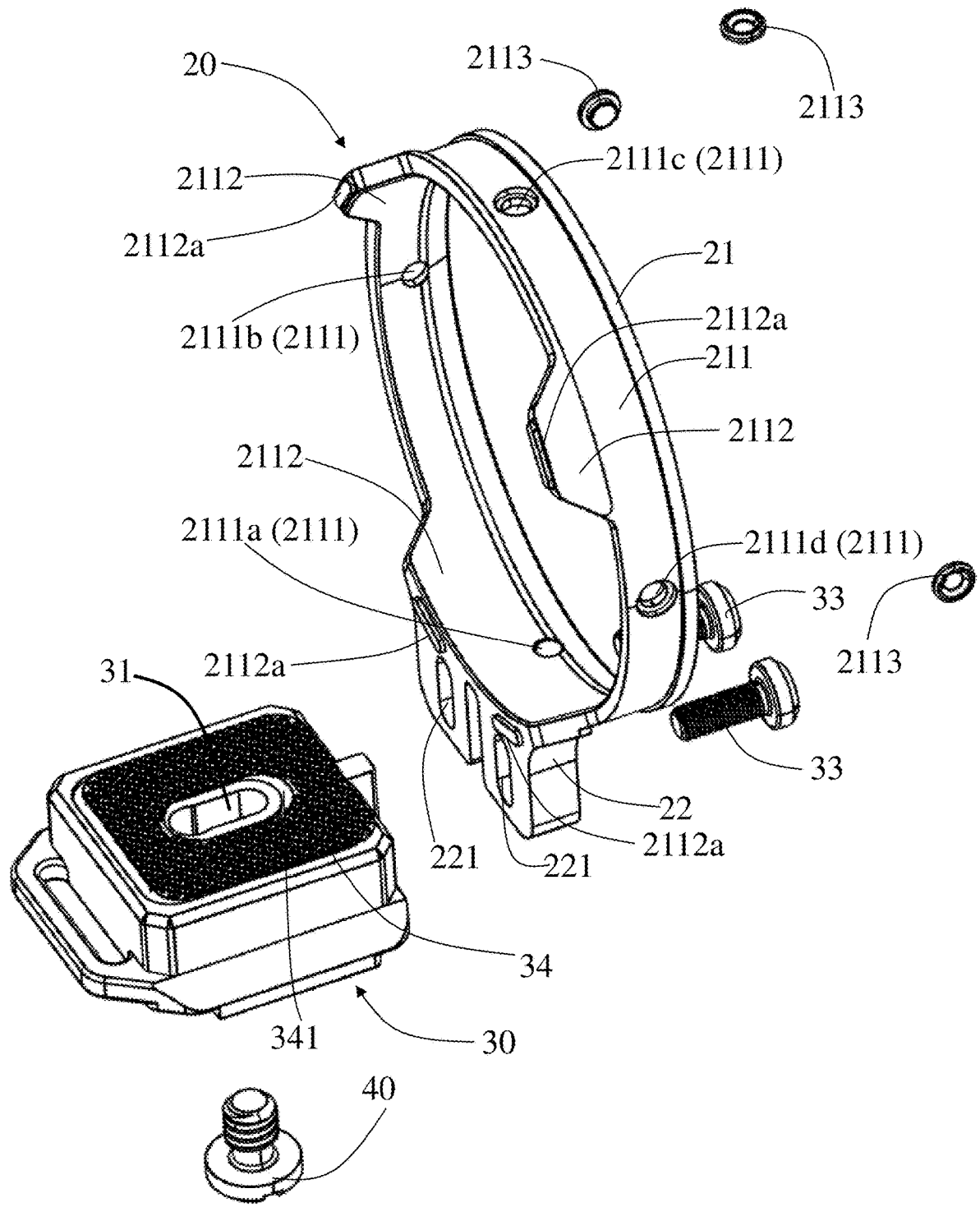
FIG. 9 illustrates a rotating unit, a camera base fixing unit and a camera fixing screw of the camera mount, wherein the rotating unit is in an explosive state.

Please see FIG. 9. It illustrates the rotating unit 20, the camera base fixing unit 30 and the camera fixing screw 40 of the camera mount 1, wherein the rotating unit 20 is in an explosive state. The rotating unit 20 includes a rotating round frame 21 and a connecting structure 22. A surrounding groove 211 is formed around a periphery of the rotating round frame 21 toward a center of circle of the rotating round frame 21. The opening of the surrounding groove 211 radiates toward the opposite direction of the center of the circle. A number of third circular perforations 2111 are formed in the bottom of the surrounding groove 211. The third circular perforations 2111 are used to temporarily position the relative rotational position between the gimbal fixing unit 10 and the rotating unit 20. According to the spirit of the present invention, preferably, the third circular perforations 2111 are formed equidistantly at the bottom of the surrounding groove 211. Namely, centers of two adjacent third circular perforations 2111 have the same distance on the periphery of the rotating round frame 21. In the present embodiment, there are 4 third circular perforations 2111, formed right below, leftmost, right above and rightmost of the rotating round frame 21, respectively. For the convenience of subsequent explanations, four third circular perforations 2111 are defined as a bottom third circular perforation 2111a, a left third circular perforation 2111b, a top third circular perforation 2111c and a right third circular perforation 2111d.

A number of camera fixing boards 2112 are formed on one side of the surrounding groove 211. The function of the camera fixing board 2112 is when the camera mount 1 is installed on the camera, the camera fixing boards 2112 are touched closely to the camera body to stop the camera body from shaking to hit the rotating round frame 21 to cause damages. Since the most stable support structure has 3 force points, the number of the camera fixing boards 2112 is also 3. The camera fixing boards 2112 are evenly and symmetrically formed on one side of the surrounding groove 211. The end of the camera fixing board 2112 can also be attached to at least one anti-collision rubber pad 2112a, which can make the protection effect better.

As shown by the dotted arrow in FIG. 3, the open ring 121 is sleeved on the surrounding groove 211 so that the rotating round frame 21 can be rotatable inside the open ring 121. In this way, the camera fixed to camera mount 1 can be rotated relative to the gimbal fixed to camera mount 1. There are two problems: first, how to conveniently set the open ring 121 on the surrounding groove 211 without damaging the open ring 121; second, how to temporarily fix the relative rotational position between the camera and gimbal. Regarding these two points, the present invention proposes related solutions as follows.

Figure 5:
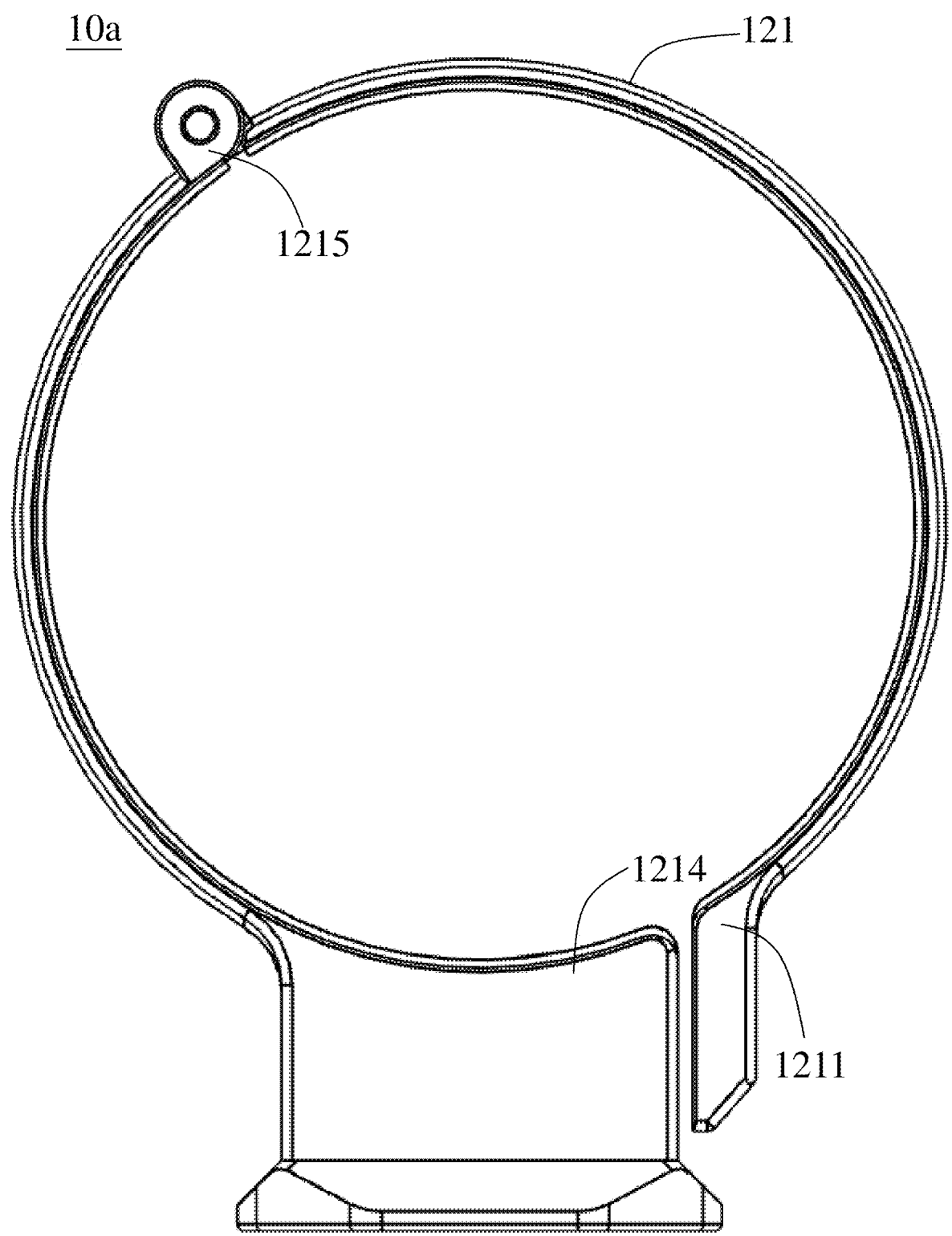
FIG. 5 is a front view of another gimbal fixing unit design.
Figure 6:
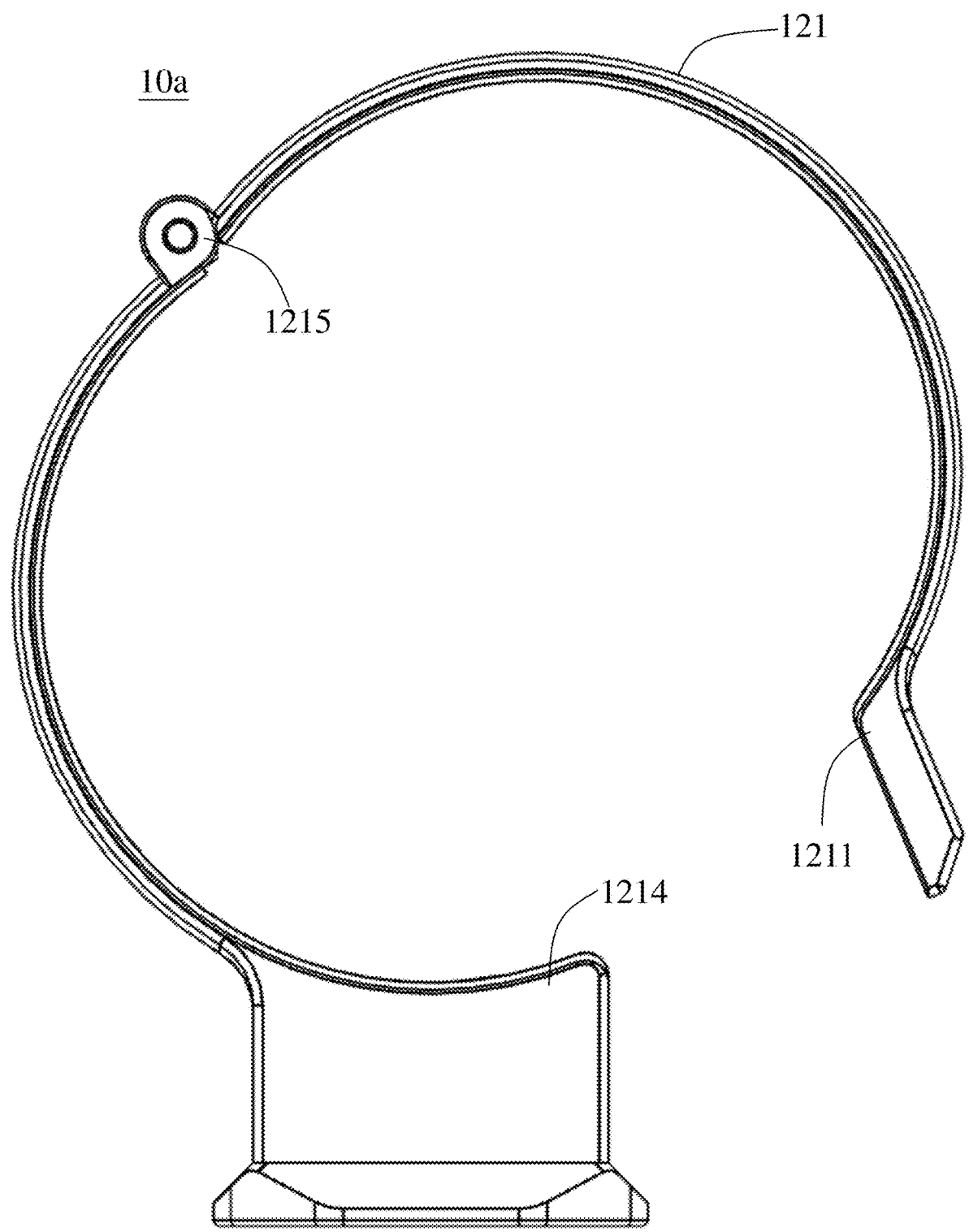
FIG. 6 is a front view showing an open ring of the gimbal fixing unit in FIG. 5 is open.

As mentioned before, the open ring 121 is a flexible structure. Increase the distance between the moving end 1211 and the fixed end 1214 by harder force to increase the content area of the open ring 121 so that the rotating round frame 21 can be placed in the open ring 121. Then, reduce the distance between the moving end 1211 and the fixed end 1214, so that the open ring 121 tightens the surrounding groove 211 of the rotating round frame 21, allowing the rotating unit 20 to smoothly rotate relative to the gimbal fixing unit 10 through the close contact between the surrounding groove 211 and the open ring 121. However, stretching the open ring 121 forcefully can still cause uneven deformation of the open ring 121, making the rotation unsmooth, and ultimately affecting the camera's direction or angle of taking pictures. Therefore, A better way to improve is shown in FIG. 5 and FIG. 6. FIG. 5 is a front view of another gimbal fixing unit 10a design. FIG. 6 is a front view showing the open ring 121 of the gimbal fixing unit 10a in FIG. 5 is open. An articulated structure 1215 is further formed between the moving end 1211 and the fixed end 1214. The moving end 1211 is able to rotate relative to the articulated structure 1215, so that the open ring 121 is open to sleeve on the surrounding groove 211, preventing from damage by external forces.

In addition, when the rotating unit 20 rotates relative to the gimbal fixing unit 10, the limit bump section 1231a is forced by the bottom of the surrounding groove 211 to move into the second circular perforation 1221; when the rotating unit 20 rotates relative to the gimbal fixing unit 10 so that the limit bump section 1231a faces the third circular perforation 2111, the limit bump section 1231a is bounced back by the spring 1232 and protrudes from the second circular perforation 1221, stuck in the third circular perforation 2111. Now, if it is to rotate the rotating unit 20 relative to the gimbal fixing unit 10, resistance will come from the limit bump section 1231a and sidewall of the third circular perforation 2111. There is a temporary positioning effect. However, if the rotation force overcomes the aforementioned resistance, the rotating unit 20 and the gimbal fixing unit 10 will continue to rotate relatively. Because the aperture of the third circular perforation 2111 is larger than the limit bump section 1231a, even the camera mount 1 is temporarily positioned, there is still slight movement between the rotating unit 20 and the gimbal fixing unit 10. To this end, a positioning ring 2113 is installed in the third circular perforation 2111 so that when the limit bump section 1231a is in the third circular perforation 2111, the limit bump section 1231a is restricted thereby the rotating round frame 21 does not rotate with the open ring 121. The aforementioned slight movement will not happen. For this, some necessary designs are needed.

Figure 10:
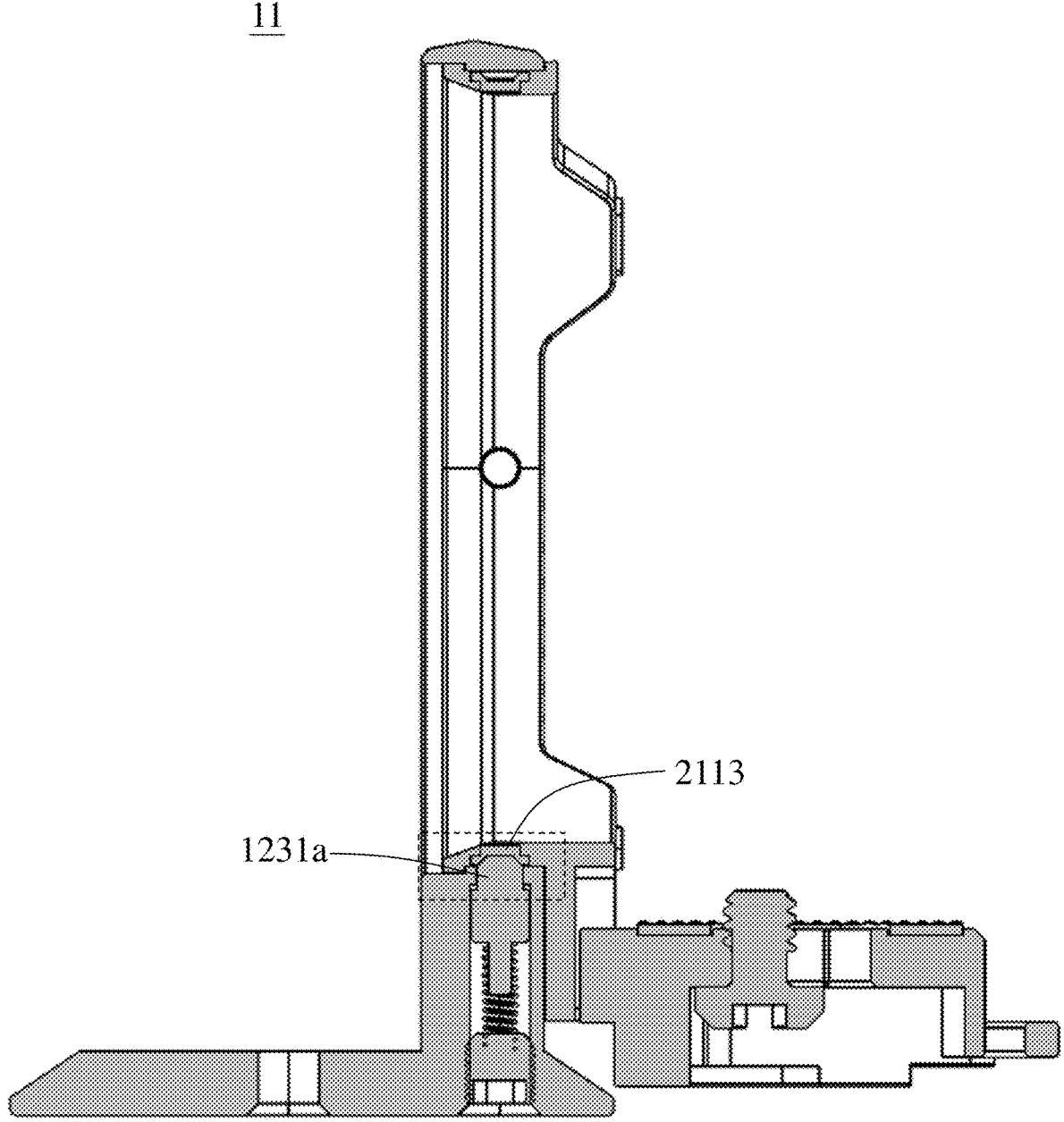
FIG. 10 is a section diagram of the camera mount along a central plane of symmetry.
Figure 11:
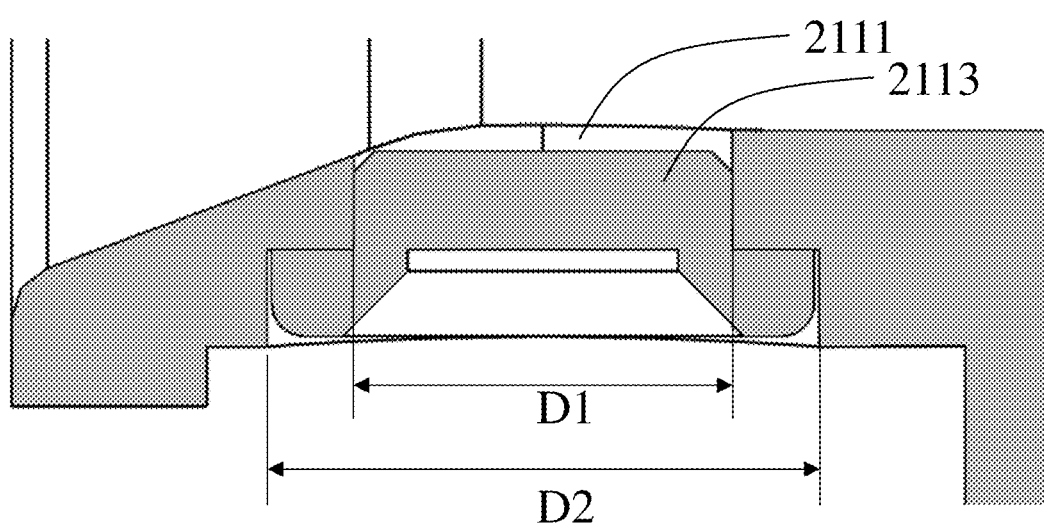
FIG. 11 is a partial enlarged view with a limit rod removed from a dashed box in FIG. 10.

Please refer to FIG. 10 and FIG. 11. FIG. 10 is a section diagram of the camera mount 1 along a central plane of symmetry. FIG. 11 is a partial enlarged view with the limit rod 1231 removed from a dashed box in FIG. 10. The third circular perforation 2111 has two segments with different inner diameters D1 and D2. Two outer diameters slightly smaller or equal to the inner diameters D1 and D2 of the two segments are formed on the outside of the positioning ring, respectively, thus the positioning ring 2113 is able to be stuck in the third circular perforation 2111 without falling. In addition, a top of the limit bump section 1231a forms a frustum. An accommodating space corresponding to the frustum is formed inside the positioning ring 2113. Thus, when the top of the limit bump section 1231a is placed in the accommodating space, the limit bump section 1231a will not shake in the third circular perforation 2111. The slight movement between the rotating unit 20 and the gimbal fixing unit 10 will not occur.

The connecting structure 22 is formed on an end of one of the camera fixing boards 2112. In the present embodiment, the aforementioned camera fixing board 2112 is below the center of the rotating round frame 21. The connecting structure 22 has a number of first through holes 221 (there are 2 in this embodiment, as shown in FIG. 9).

In terms of materials, the parts of the rotating unit 20, except the anti-collision rubber pad 2112a, can be made of aluminum alloy or stainless steel.

Please refer to FIG. 2, FIG. 3 and FIG. 9 at the same time. The camera base fixing unit 30 is the component used to fix the camera mount 1 to the bottom of the camera. A second through hole 31 is formed in the center of the camera base fixing unit 30. One side of the camera base fixing unit 30 has a number of second screw holes 32 (2 in the embodiment). Screws 33 pass through the first through holes 221 to lock in the second screw holes 32, respectively. So that the camera base fixing unit 30 is fixed to the rotating unit 20. A top of the camera base fixing unit 30 is a plane. An elastic anti-slippery board 34 is attached to the plane. The elastic anti-slippery board 34 can be a rubber pad with a rough surface, and its purpose is to increase the friction between the camera base fixing unit 30 and the camera. A third through hole 341 is formed in the elastic anti-slippery board 34 where is corresponding to the second through hole 31. The third through hole 341 and second through hole 31 are similar in appearance but slightly larger than the latter. The camera base fixing unit 30 can also be made of aluminum alloy or stainless steel.

The camera fixing screw 40 passes through the second through hole 31 and the third through hole 341, and is connected to a screw hole at a bottom of a camera (not shown) to detachably fix the camera base fixing unit 30 to the camera (the camera located above the elastic anti-slippery board 34). The tightening screw 50 passes through the first circular perforation 1213 and is screwed to the first screw hole 1222. When the tightening screw 50 is tightened, the moving end 1211 of the open ring 121 moves closer to the fixed end 1214. The open ring 121 has a smaller content area. The open ring 121 clamps the surrounding groove 211 to limit the relative position of the rotating round frame 21 and the open ring 121. It should be noted that at this time the "clamping" of the above two is caused by the friction between each other. This is different from the effect of temporary positioning caused by the resistance of the side wall of the third circular perforation 2111 and the limit bump section 1231a. The former can occur at any position of the rotating round frame 21 relative to the open ring 121, and the latter can only occur at a specific relative position. Namely, using the design of the limit bump section 1231a and the third circular perforation 2111, the user can be reminded of the specific composition angle of the camera, such as forward, 90 degrees, 180 degrees and 270 degrees, and stay there temporarily. However, when the user turns it to 225 degrees and find out the best composition angle, he can use the tightening screw 50 to force the rotating round frame 21 and the open ring 121 to not rotate relative to each other, so as to use the camera for photography. Unscrew the tightening screw 50 when the angle needs to change. The camera fixing screw 40 and the tightening screw 50In practice are special products. Aluminum alloy or stainless steel can be used as material.

Figure 12:
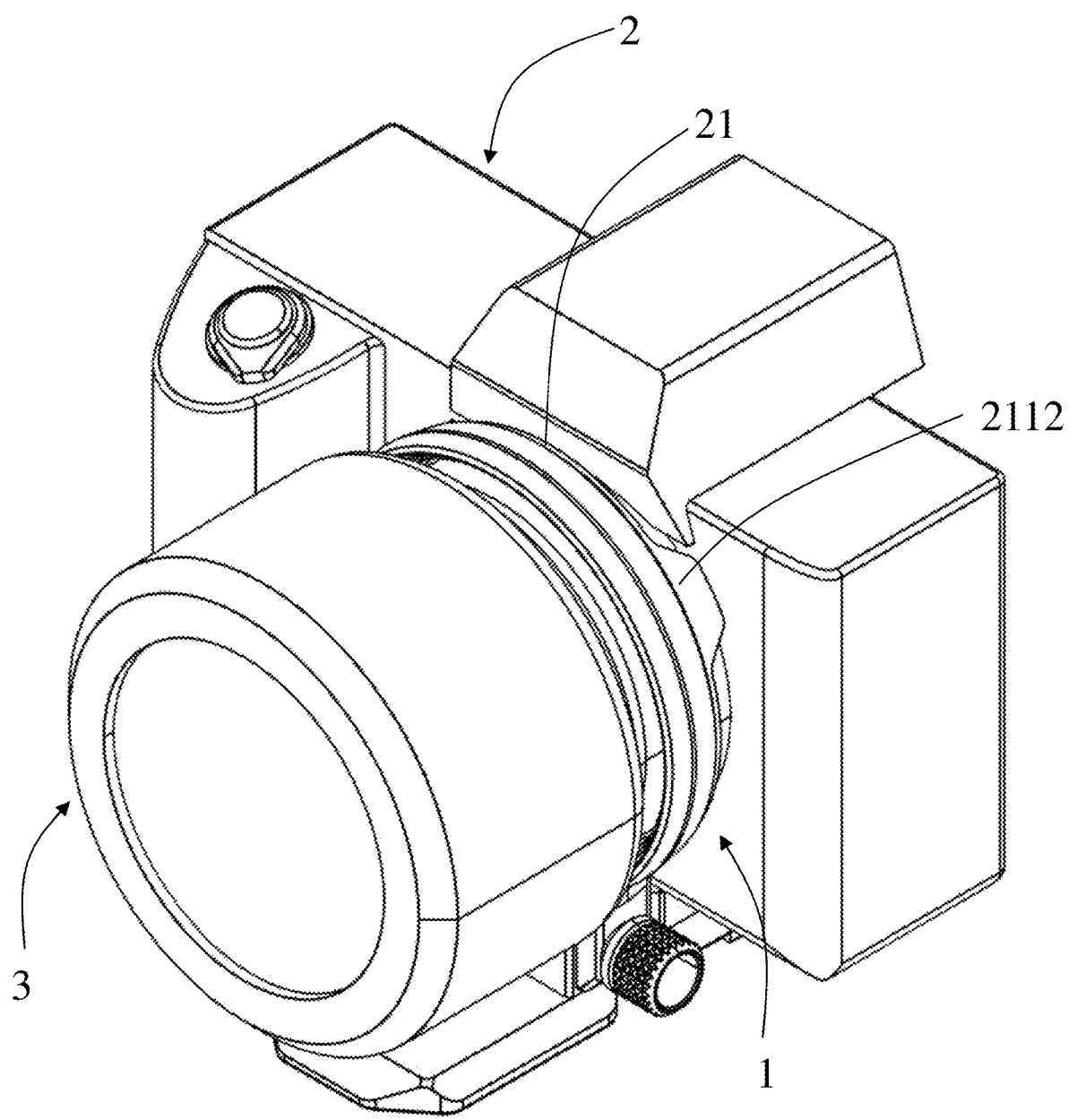
FIG. 12 illustrates the camera mount combined with the camera.

Please see FIG. 12. It illustrates the camera mount 1 combined with the camera. The camera body 2 can touch closely to the camera mount 1 by the camera fixing board 2112, not shaking to hit the rotating round frame 21. A camera lens 3 is able to install on the camera body 2 through the rotating round frame 21, or remove from the camera body 2. Such a design also facilitates lens replacement.

Figure 13:
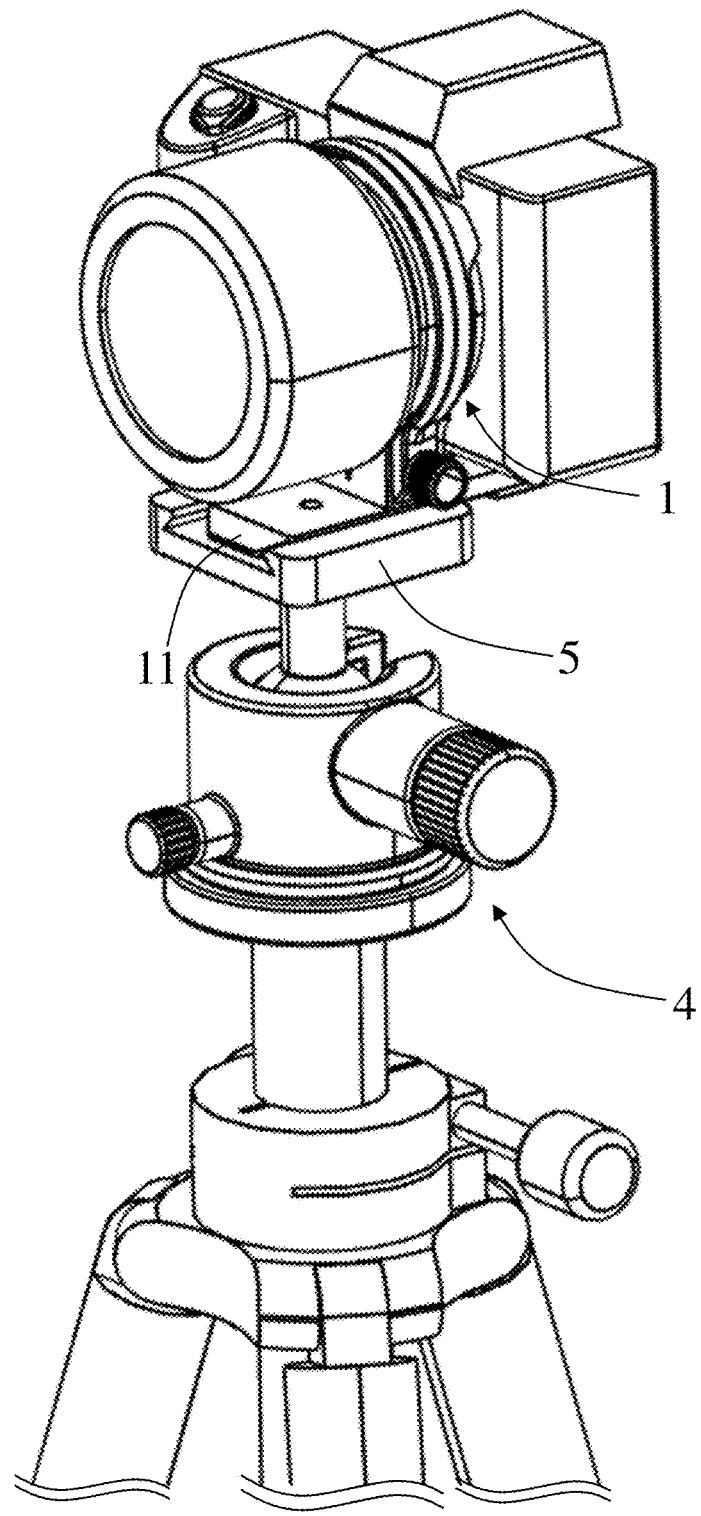
FIG. 13 illustrates that the camera mount is combined with the camera and installed on a gimbal tripod.

Please see FIG. 13. It illustrates that the camera mount 1 is combined with the camera and installed on a gimbal tripod 4. When installing, just insert the fixing portion 11 of the gimbal fixing unit 10 into the corresponding position of the gimbal 5 of the gimbal tripod 4.

Figure 14:
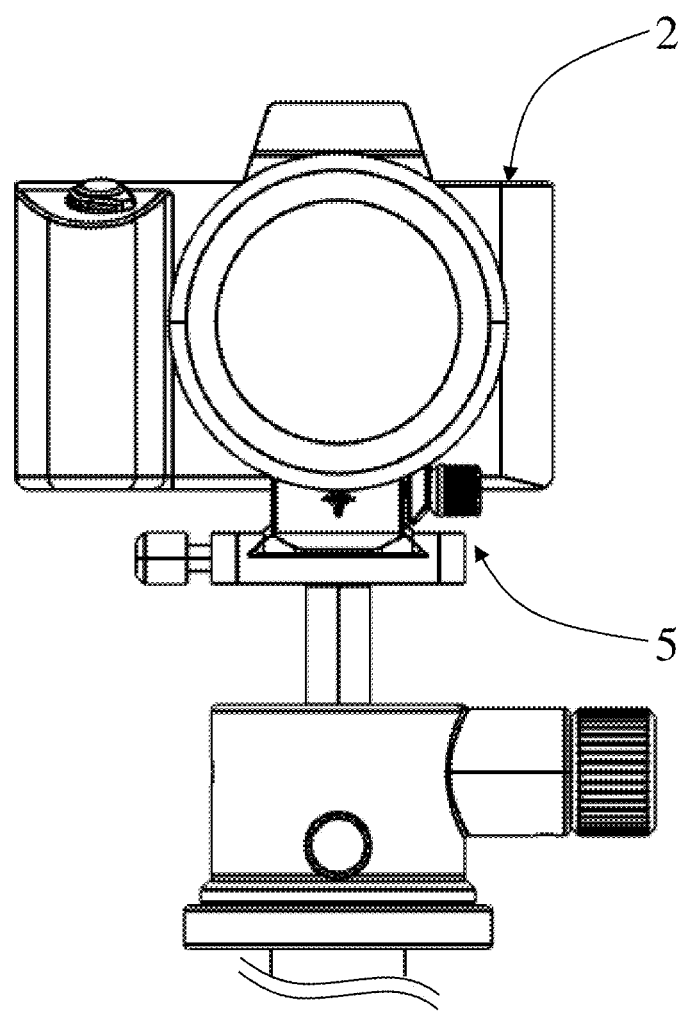
FIG. 14 to FIG. 16 illustrate the camera is at 0 degree, 90 degree and 180 degree composition angle, respectively.
Figure 15:
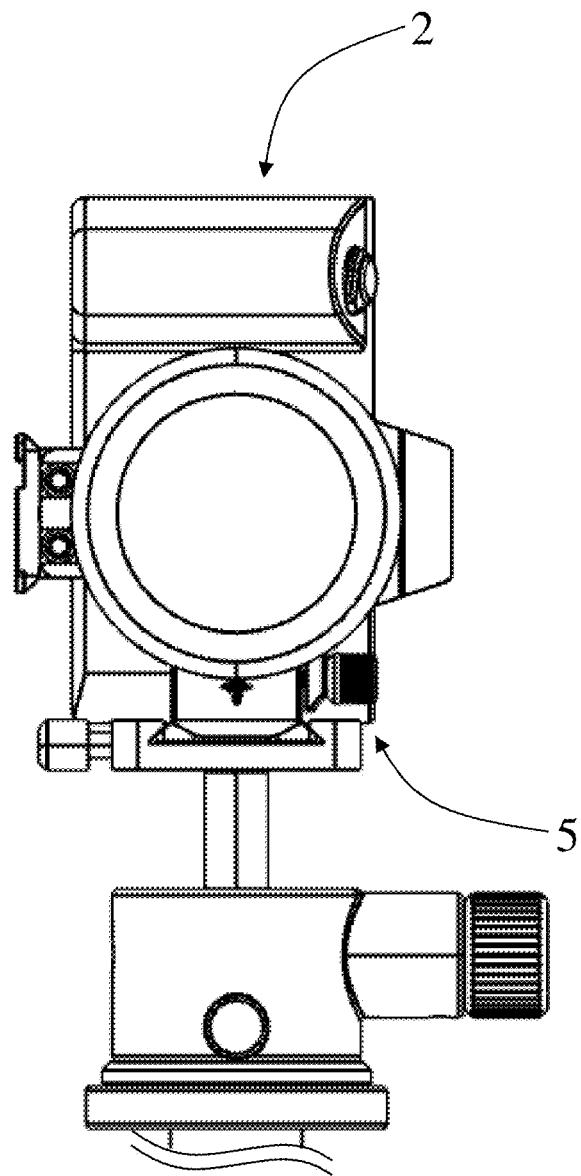
Figure 16:
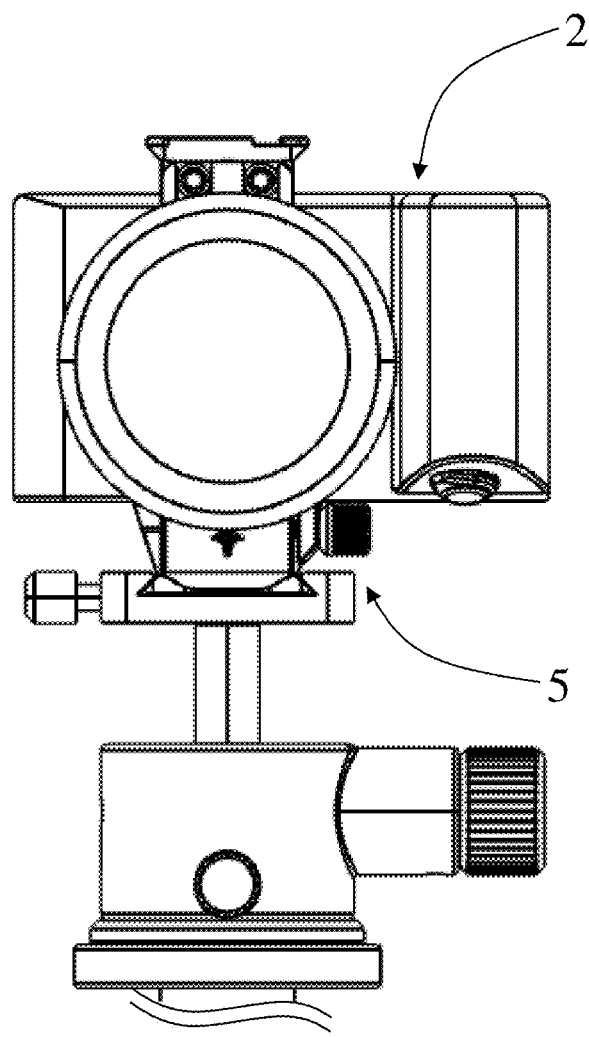

Finally, please refer to FIG. 14 to FIG. 16. These figures illustrate the camera is at 0 degree, 90 degree and 180 degree composition angle, respectively. The limit bump section 1231a of FIG. 14 falls into the bottom third circular perforation 2111a. The camera body 2 is in an upright state. Therefore, the composition angle is 0 degree. The limit bump section 1231a of FIG. 15 falls into the left third circular perforation 2111b. The camera body 2 rotate 90 degrees clockwise. Therefore, the composition angle becomes 90 degrees. Similarly, The limit bump section 1231a of FIG. 16 falls into the top third circular perforation 2111c. The camera body 2 turns 90 degrees clockwise again. The camera body 2 is in an upside-down state. Therefore, the composition angle becomes 180 degrees. However, as mentioned before, as long as the user is willing, he may stop turning at any ideal angle to tighten the tightening screw 50. The camera body 2 can also temporarily stay at the composition angle for photography. It should be noted that although 4 third circular perforations 2111 are used in this embodiment, according to different temporary positioning requirements, there may be 6, 8, 12, or even more third circular perforation 2111. It is not limited by the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A camera mount, comprising:
   a fixing unit, comprising:
      a fixing portion, detachably connectable to a camera; and
      a rotating portion, comprising:
         an open ring, wherein curvature of an inner surface of the open ring is changeable by force, and an extension section is formed on a moving end of the open ring,
         a holding body, vertically formed above the fixing portion and connected to a lower part of a fixed end of the open ring, wherein a second circular perforation is formed through the fixing portion, the holding body and the lower part of the fixed end; and
         an elastic limit device, installed inside the second circular perforation, capable of being elastically protruded into the open ring and pressed back into the second circular perforation;
   a rotating unit, comprising:
      a rotating round frame, wherein a surrounding groove is formed around a periphery of the rotating round frame toward a center of circle of the rotating round frame, a plurality of third circular perforations are formed in the bottom of the surrounding groove, and the open ring is sleeved on the surrounding groove so that the rotating round frame is rotatable inside the open ring; and
      a connecting structure having a plurality of first through holes;
   a camera base fixing unit, wherein a second through hole is formed in the center of the camera base fixing unit, one side of the camera base fixing unit has a plurality of second screw holes, and screws pass through the first through holes to lock in the second screw holes, respectively, so that the camera base fixing unit is fixed to the rotating unit;
   a camera fixing screw, connected to a screw hole at a bottom of a camera through the second through hole to detachably fix the camera base fixing unit to a camera; and
   a locking mechanism connecting the extension section to the holding body, which when moved to a locking position moves the moving end close to the fixed end and causes the open ring to clamp the surrounding groove to limit the relative position of the rotating round frame and the open ring.

2. The camera mount according to claim 1, wherein the elastic limit device further comprises:
   a limit rod, having a limit bump section, a stop section formed below the limit bump section, and a spring fixing section formed below the stop section, wherein an outer diameter of the stop section is larger than that of the limit bump section and that of the spring fixing section;
   a spring, having one end covering outside of the spring fixing section; and
   a positioning screw, touched closely to the other end of the spring by an end thereof,
   wherein, the second circular perforation narrows to the inside at the fixed end, allowing the limit bump section to pass but not allowing the stop section to pass; an internal thread is formed in the second circular perforation in the fixing portion for screwing the positioning screw; when the rotating unit rotates relative to the gimbal fixing unit, the limit bump section is forced by the bottom of the surrounding groove to move into the second circular perforation; when the rotating unit rotates relative to the gimbal fixing unit so that the limit bump section faces the third circular perforation, the limit bump section is bounced back by the spring and protrudes from the second circular perforation, stuck in the third circular perforation.

3. The camera mount according to claim 2, wherein a positioning ring is installed in the third circular perforation so that when the limit bump section is in the third circular perforation, the limit bump section is restricted thereby the rotating round frame does not rotate with the open ring.

4. The camera mount according to claim 3, wherein a top of the limit bump section forms a frustum, and an accommodating space corresponding to the frustum is formed inside the positioning ring.

5. The camera mount according to claim 3, wherein the third circular perforation has two segments with different inner diameters, and two outer diameters slightly smaller or equal to the inner diameters of the two segments are formed on the outside of the positioning ring, respectively, thus the positioning ring is able to be stuck in the third circular perforation without falling.

6. the camera mount according to claim 1, wherein a top of the camera base fixing unit is a plane, an elastic anti-slip board is attached to the plane to increase the friction between the camera base fixing unit and the camera, and a third through hole is formed in the elastic anti-slip board where is corresponding to the second through hole.

7. The camera mount according to claim 1, wherein an articulated structure is further formed between the moving end and the fixed end, and the moving end is able to rotate relative to the articulated structure so that the open ring is open to sleeve on the surrounding groove.

8. The camera mount according to claim 1, wherein the third circular perforations are formed equidistantly at the bottom of the surrounding groove.

9. The camera mount according to claim 1, wherein a fourth circular perforation is further formed in the fixing portion for fixing the camera gimbal with a screw.

10. The camera mount according to claim 1, wherein the fixing portion is a flat structure having a pair of guide rails.

11. The camera mount according to claim 1, wherein the locking mechanism comprises:
   a first screw hole perpendicular to the second circular perforation formed in one side of the holding body,
   a first circular perforation formed through the extension section, and
   a tightening screw screwed to the first screw hole through the first circular perforation; and
   wherein when the tightening screw is tightened, the moving end moves closer to the fixed end and the open ring clamps the surrounding groove to limit the relative position of the rotating round frame and the open ring.

12. The camera mount according to claim 1, wherein a plurality of camera fixing boards are formed on the rotating round frame on one side of the surrounding groove, and the connection structure is formed on an end of one of the camera fixing boards.

13. the camera mount according to claim 12, wherein when the camera mount is installed on the camera, the camera fixing boards are touched closely to the camera body to stop the camera body from shaking to hit the rotating round frame, and a camera lens is able to be installed on or removed from the camera body through the rotating round frame.

\* \* \* \* \*